United States Patent
Müller et al.

(10) Patent No.: US 8,898,904 B2
(45) Date of Patent: Dec. 2, 2014

(54) METHOD FOR COATING A STEERING WHEEL AND CORRESPONDING STEERING WHEEL

(75) Inventors: Norbert Müller, Aschaffenburg (DE); Christian Haart, Obernburg (DE); Martin Sauer, Hösbach (DE); Jürgen Kolb, Aschaffenburg (DE); Daniel Henning, Aschaffenburg (DE); Albert Schlechter, Kleinwallstadt (DE); Abdullah Yanginci, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 871 days.

(21) Appl. No.: 12/671,803

(22) PCT Filed: Jul. 9, 2008

(86) PCT No.: PCT/EP2008/058888
§ 371 (c)(1), (2), (4) Date: Feb. 2, 2010

(87) PCT Pub. No.: WO2009/016007
PCT Pub. Date: Feb. 5, 2009

(65) Prior Publication Data
US 2011/0232414 A1 Sep. 29, 2011

(30) Foreign Application Priority Data
Aug. 2, 2007 (DE) .......................... 10 2007 036 802

(51) Int. Cl.
- *B62D 1/06* (2006.01)
- *B29C 63/04* (2006.01)
- *B29C 63/00* (2006.01)
- *B29L 31/30* (2006.01)

(52) U.S. Cl.
CPC ........... *B62D 1/06* (2013.01); *B29L 2031/3047* (2013.01); *B29C 63/046* (2013.01); *B29C 63/0073* (2013.01)

USPC ................................... 29/894.381; 29/894.38

(58) Field of Classification Search
USPC ..................... 29/894.1, 894.381, 894.38, 458
See application file for complete search history.

(56) References Cited

U.S. PATENT DOCUMENTS 2,327,931 A * 8/1943 Ratner .......................... 264/46.9
5,251,506 A 10/1993 Itagaki
(Continued)

FOREIGN PATENT DOCUMENTS

DE 73 01 718 U 4/1973
DE 72 44 584 U 7/1973
(Continued)

OTHER PUBLICATIONS

Office Action issued in counterpart Japanese Application No. 2010-518598 dated Apr. 24, 2012 (3 pages) and an English translation of the same (2 pages).
(Continued)

*Primary Examiner* — Christopher Besler
(74) *Attorney, Agent, or Firm* — Fitch Even Tabin & Flannery, LLP

(57) ABSTRACT

A method for coating a steering wheel and a corresponding steering wheel having a steering wheel rim comprising a steering wheel skeleton having a foam layer applied thereto and intended to be encompassed by a cover layer made of leather or plastic are provided. In order to simplify production, the cover layer is positioned on the steering wheel rim as a strip and is fixed to the foam layer on one end. The cover layer strip is then glued onto the foam layer and the lateral edges of the cover layer strip are sewed together in a known manner.

5 Claims, 1 Drawing Sheet

(56) References Cited

U.S. PATENT DOCUMENTS

| | | | |
|---|---|---|---|
| 6,386,064 B1* | 5/2002 | Hayakawa et al. | 74/558 |
| 6,443,030 B1* | 9/2002 | Schuler | 74/552 |
| 2006/0066084 A1 | 3/2006 | Kreuzer et al. | |

FOREIGN PATENT DOCUMENTS

| | | |
|---|---|---|
| DE | 27 16 449 A1 | 10/1978 |
| DE | 41 29 664 A1 | 3/1992 |
| DE | 199 15 248 A1 | 10/2000 |
| DE | 100 36 069 A1 | 2/2002 |
| DE | 20 2004 015 234 U1 | 3/2005 |
| DE | 10 2007 028 201 A1 | 12/2008 |
| EP | 1 914 148 A2 | 4/2008 |
| JP | S62-047472 U | 3/1987 |
| JP | H03-005675 U | 1/1991 |
| JP | H03-028075 U | 3/1991 |
| JP | H04-055164 A | 2/1992 |
| JP | H04-059474 A | 2/1992 |
| WO | WO 02/06108 A1 | 1/2002 |

OTHER PUBLICATIONS

Notification of the First Office Action issued in counterpart Chinese Application No. 200880100684.5 dated Mar. 29, 2011 (5 pages) and an English translation of the same (6 pages).

English translation of the International Preliminary Report on Patentability (Chapter I or Chapter II of the Patent Cooperation Treaty) from the International Bureau of WIPO for International Application No. PCT/EP2008/058888 dated Jun. 10, 2010, 10 pages.

* cited by examiner

METHOD FOR COATING A STEERING WHEEL AND CORRESPONDING STEERING WHEEL

CROSS-REFERENCE TO RELATED APPLICATIONS

This application is a U.S. national phase application filed under 35 U.S.C. §371 of International Application PCT/EP2008/058888, filed on Jul. 9, 2008, designating the United States, which claims priority from German Application 10 2007 036 802.1, filed Aug. 2, 2007, which are hereby incorporated herein by reference in their entirety.

BACKGROUND

The invention relates to a method for coating a steering wheel and a corresponding steering wheel.

In general, steering wheels have a steering wheel skeleton with an circular steering wheel rim which is encompassed by a foam layer. A cover layer made of leather or plastic is applied onto this foam layer. This mode of applying a cover layer, in the following designated as leathering, has so far exclusively been carried out by manual work. Thereby, a leather or plastic stripe is at first assembled to a ring according to the ring form of the steering wheel rim. This ring is mounted onto the steering wheel rim. Subsequently, the foam layer of the steering wheel rim is provided with a glue with which the cover layer is then fixed on the foam layer. In a further working step the lateral edges of the ring are sewed to each other by hand.

This method has the disadvantage that the ring-like stripe of the cover layer can only be positioned on the steering wheel rim with difficulties since this process can exclusively be carried out manually.

SUMMARY

The object of the invention is to change the leathering in such a manner that it can be carried out at least in part by the means of a device, e.g. that the process is at least partly automatable.

In a method according to an exemplary embodiment of the invention for coating a steering wheel having a steering wheel rim comprising a steering wheel skeleton with an applied foam layer which is intended to be encompassed by a cover layer made of leather or plastic the cover layer is according to the invention positioned as a strip on the steering wheel rim and is fixed to the foam layer on only one end. Subsequently, the cover layer strip is then glued onto the foam layer and the lateral edges of the cover layer strip are sewed together in a known manner.

According to this method the cover layer strip is therefore not assembled to a ring before applying onto the foam layer. Thus, the strip can be positioned on the steering wheel rim by the means of a device whereby the leathering process can be carried out more conveniently than before. Furthermore, it is more easily possible to use leather with different strings, e.g. of lower quality, whereby the optics and the quality of the steering wheels leathered in such a manner correspond to the quality of the steering wheels until now leathered by hand.

It is of an advantage to insert the cover layer strip into a slide, to mount pivotably the steering wheel rim and to move the slide and the steering wheel rim relatively to each other for connecting the steering wheel rim with a cover layer strip whereby the steering wheel is simultaneously rotated. Thereby, an exact positioning of the cover layer strip in relation to the steering wheel rim is guaranteed.

By using this method it is meaningful to apply the glue already before applying the cover layer strip onto the foam layer of the steering wheel rim. This is possible since the cover layer strip is positioned correctly right from the beginning due to the use of a device and a readjusting is not required. It is of an advantage to provide the foam layer with a double sided adhesive tape before applying the cover layer strip. The adhesive tape is preferably applied onto the outer side of the steering wheel rim, e.g. there where the steering wheel rim has its largest diameter.

It is furthermore of an advantage to fix the cover layer strip with one end in a groove continuing crosswise to the steering wheel rim in the foam layer after the positioning on the steering wheel rim and the other end of the strip is also fixed in the groove after its fixation on the foam layer.

By using a cover layer strip composed of multiple parts in longitudinal direction these parts are stitched after punching, e.g. already before applying it onto the steering wheel skeleton, and are sewed together to the cover layer strip.

This method for leathering a steering wheel is considerably faster than the previous leathering method and therefore also cheaper.

In case of a steering wheel with a steering wheel rim having a steering wheel skeleton with an applied foam layer which is encompassed by a cover layer made of leather or plastic and which is in particular obtained by the previously mentioned method the cover layer comprises a strip positioned on the foam layer by the means of a device whereby its ends are being separated from each other before its attachment to the foam layer. The foam layer has preferably a groove continuing crosswise to the steering wheel rim for the fixation of both ends of the cover layer strip. In a further embodiment at least one spring clip for the fixation of both ends of the cover layer strip is provided in the groove. The clip is preferably made of spring steel.

BRIEF DESCRIPTION OF THE DRAWINGS

The invention is explained on the basis of an example by the means of drawings.

DETAILED DESCRIPTION

Figure 1:
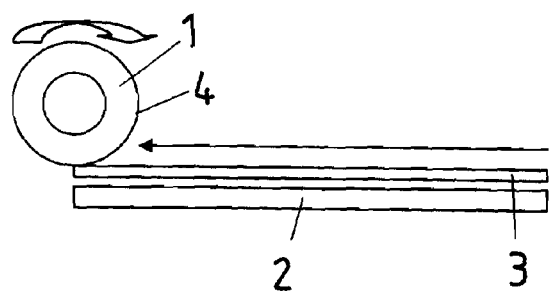
FIG. 1 shows the allocation of the device for leathering the steering wheel rim schematically.
Figure 2:
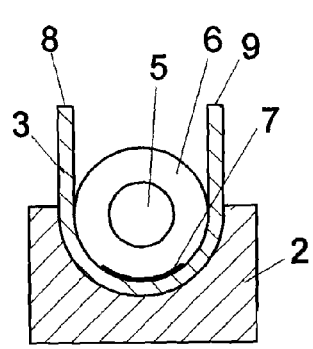
FIG. 2 shows an enlarged section through the slide according to FIG. 1.

A steering wheel 1 having a steering wheel rim to be leathered is schematically shown in FIG. 1. The steering wheel 1 is positioned in a not shown device such that it is pivotable around its axis. A slide 2 on which a cover layer strip 3 was positioned is provided for the steering wheel 1. As can be seen from FIG. 2 the cover layer strip 3 lies in the slide 2 already in a preformed manner. The steering wheel has been provided on the outer side 4 of the steering wheel rim with double sided adhesive tape 7.

Figure 3:
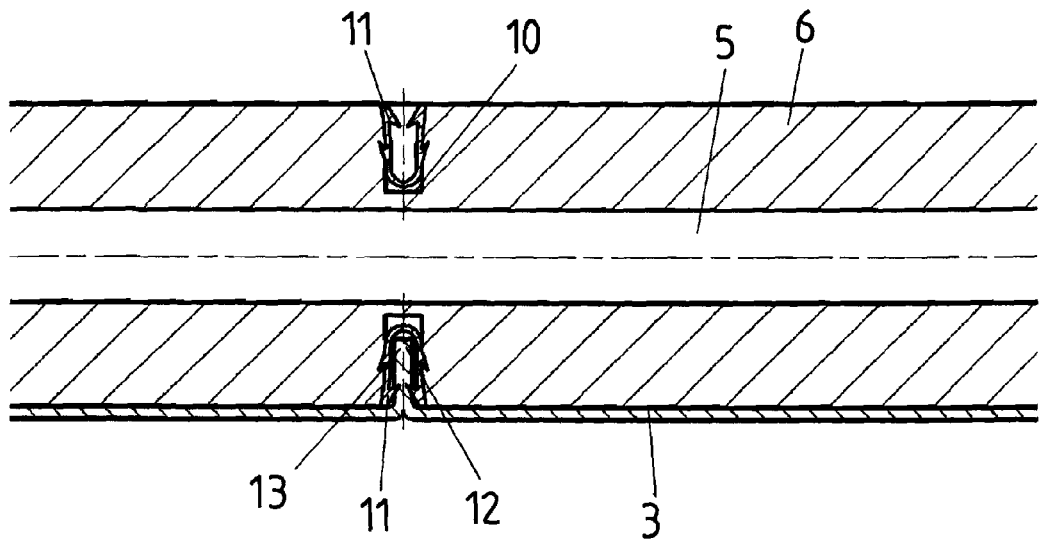
FIG. 3 shows an enlarged longitudinal section through a section of the steering wheel rim.

As can be seen in FIG. 3 the steering wheel rim has a foam layer 6 on the steering wheel skeleton 5. In this a circulating groove 10 continuing crosswise to the steering wheel rim is provided in which multiple spring clips 11 are arranged.

The coating of the steering wheel rim with the cover layer strip 3 is been carried out now in such a manner that an end 12 of the cover layer strip 3 is clamped into the clip 11. Afterwards the steering wheel 1 is rotated into the direction of the upper spanned arrow (FIG. 1) and simultaneously the slide 2 is moved into the direction of the linear arrow (FIG. 1) until the cover layer strip 3 is completely fixed on the foam layer 6 of the steering wheel rim. Due to the pre-forming of the cover layer strip 3 the same fits already closely to the foam layer 6 at about half way of the same. Subsequently, the other free end 13 of the cover layer strip is also fixed in the clip 11.

The leathering is finished by laying the cover layer strip completely around the foam layer and by sewing the lateral edges 8, 9 in a usual manner by hand.

The invention claimed is:

1. A method for coating a steering wheel with a cover layer made of leather or plastic, wherein the steering wheel comprises a steering wheel rim comprising a steering wheel skeleton with a foam layer applied thereon, the method comprising: positioning the cover layer as a strip on the steering wheel rim, wherein the strip has lateral edges, and fixing the cover layer to the foam layer on one end, subsequently gluing the cover layer strip onto the foam layer and sewing the lateral edges of the cover layer strip together, wherein the cover layer strip is not assembled into a ring before being positioned onto the foam layer, wherein before gluing the cover layer strip onto the foam layer, the cover layer strip is inserted into a slide configured to be linearly moved, the steering wheel rim is pivot-mounted, and the slide and the steering wheel rim are relatively moved to each other for connecting the steering wheel rim with the cover layer strip, whereby the steering wheel is simultaneously rotated as the slide is linearly moved.

2. The method according to claim 1, wherein the foam layer is provided with a double sided adhesive tape before applying the cover layer strip.

3. The method according to claim 2, wherein the double sided adhesive tape is applied onto the outer side of the steering wheel rim.

4. The method according to claim 1 wherein the cover layer strip comprising ends is fixed after the positioning on the steering wheel rim with one of the ends in a groove continuing crosswise to the steering wheel rim in the foam layer and the other of the ends of the strip is also fixed in the groove after its fixation on the foam layer.

5. The method according to claim 1, wherein in case of using a cover layer strip composed of multiple parts in longitudinal direction these parts are stitched after punching out and are sewed to the cover layer strip.

\* \* \* \* \*